United States Patent
Hunsberger et al.

[19]

[11] Patent Number: 6,155,804
[45] Date of Patent: Dec. 5, 2000

[54] SOUND ATTENUATING MOTOR END SHIELD FOR A HYDRAULIC PUMP

[76] Inventors: Dale Hunsberger, 6097 Dana Dr., Rockford, Ill. 61109; Julie Harwath, 6781 S. Lowden Rd., Oregon, Ill. 61061; Frank Harwath, 6364 Condon Rd., Stillman Valley, Ill. 61084

[21] Appl. No.: 09/226,567

[22] Filed: Jan. 7, 1999

Related U.S. Application Data

[63] Continuation-in-part of application No. 08/908,896, Aug. 8, 1997.
[60] Provisional application No. 60/024,014, Aug. 15, 1996.

[51] Int. Cl.[7] ............................... F04B 35/04; H02K 5/24
[52] U.S. Cl. .......................... 417/410.1; 181/202; 310/51
[58] Field of Search .......................... 417/410.1; 310/51; 181/202

[56] References Cited

U.S. PATENT DOCUMENTS

| | | | |
|---|---|---|---|
| 4,688,324 | 8/1987 | Morrill | 29/596 |
| 5,536,140 | 7/1996 | Wagner et al. | 415/119 |
| 5,605,448 | 2/1997 | Martin, Sr. | 417/360 |
| 5,997,258 | 12/1999 | Sawyer, III et al. | 417/312 |

*Primary Examiner*—Charles G. Freay

[57] ABSTRACT

A hydraulic pump-motor having an end shield which deadens the sound generated by the pump-motor to thereby result in a quieter unit. The present invention provides a conventional hydraulic pump-motor having an electric motor coupled to a pumping mechanism wherein the motor includes an improved sound attenuating end shield design. Through the use of acoustically deadening materials such as cast iron and polypropylene plastic in the end plates of the present invention deaden the sounds stemming from the vibration of the pump-motor. The end shield includes a ring member which may be die cast aluminum that secures the stator to the housing a central plug of such materials as cast iron or plastic that fills the central opening of the ring member.

20 Claims, 1 Drawing Sheet

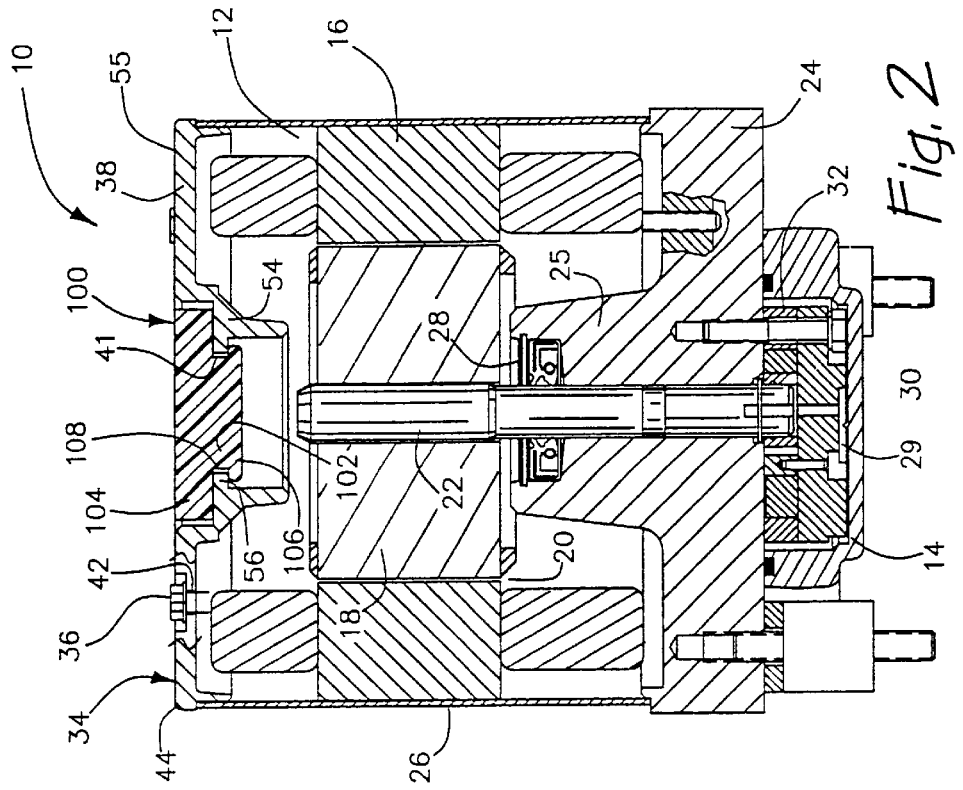
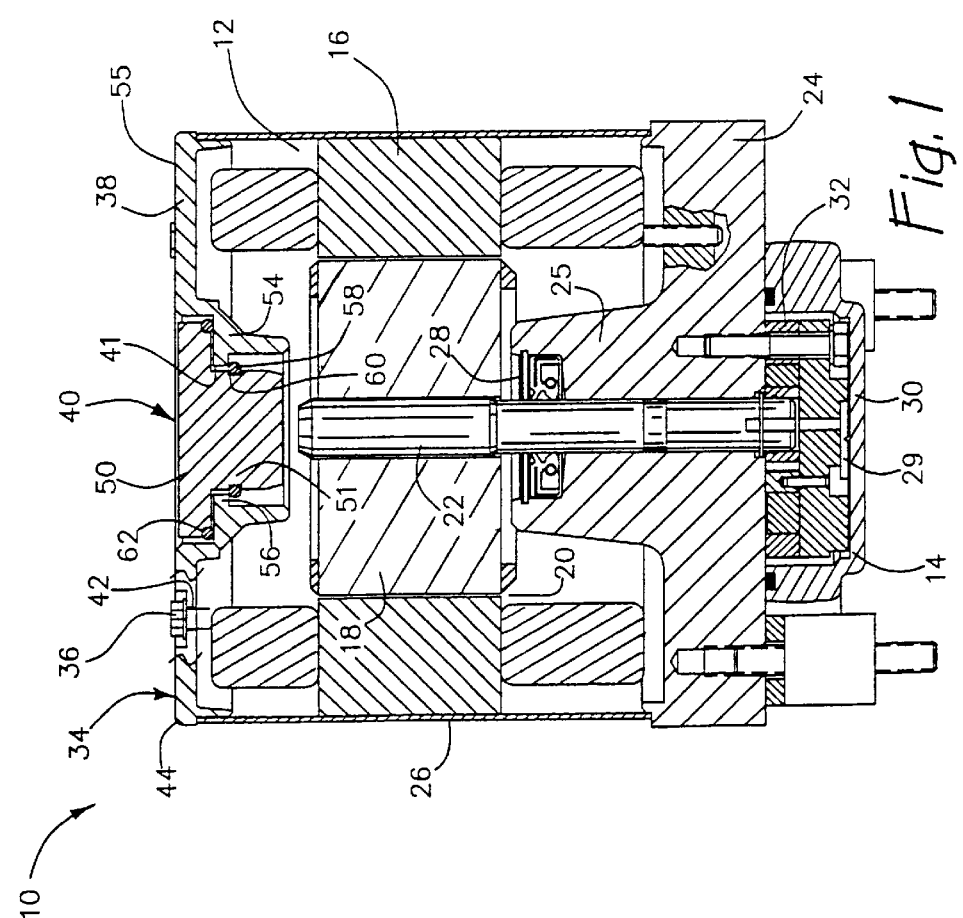

SOUND ATTENUATING MOTOR END SHIELD FOR A HYDRAULIC PUMP

CROSS-REFERENCE TO RELATED APPLICATION

This application is a continuation-in-part of U.S. patent application Ser. No. 08/908,896, filed on Aug. 8, 1997, which claims the priority date benefit of U.S. Provisional Patent Application Ser. No. 60/024,014, filed on Aug. 15, 1996.

FIELD OF THE INVENTION

The present invention generally relates to hydraulic pump-motors, and more particularly relates to hydraulic pump-motor housings.

BACKGROUND OF THE INVENTION

In a typical hydraulic pump-motor, an electric motor is provided to drive a hydraulic pump and increase the pressure of the hydraulic fluid processed through the pump. By varying the hydraulic load, the resulting output pressure of the hydraulic fluid is correspondingly varied and a broad range of pressures is obtainable.

However, the operation of the motor and pump results in considerable vibration of the pump-motor unit, which is communicated to the end shield of the motor and ultimately to those in the vicinity of the pump-motor in the form of noise. The shape and position of conventional motor end shields, as well as the material from which the end shields are typically manufactured, have contributed to a drum-like effect in that the end shield reverberates during operation and thereby produces considerable acoustic output. This problem is accentuated when the pump is of a reciprocating type in that with each movement of the piston a pulse is generated, and this pulsating output is transmitted to the end shield of the motor. Since such pump-motors are commonly used in commercial applications, e.g., dental chairs, cosmetology chairs, and hospital beds, this output noise has been the source of substantial annoyance and dissatisfaction.

The prior art has typically employed a standard die cast aluminum end shield which provides little, if any noise attenuation. Some improvement has been attained by making the end shield of cast iron as opposed to aluminum. Given the natural frequency of these metals and the frequency with which pump-motors vibrate, as well as the planar shape of typical end shields, these end shields have proven to have inadequate sound deadening characteristics and, in fact, act much like a drum as the pump-motor operates.

In an effort to improve noise reduction, the standard die cast aluminum end shields of typical pump-motors have been replaced by specially shaped cast iron, plastic, or other material end shields. Given the natural frequency and sound deadening effects of such shapes, this design has provided improved sound reduction, but even greater reduction in acoustic output is desirable.

Moreover, typical end shields are secured to the motor via the same bolts which hold the stator of the motor in place. Therefore the end shield must be made from a material with sufficient strength to provide a good clamping surface for the stator screws. However, materials with good sound attenuation qualities often do not have sufficient strength to provide a good clamping surface. In addition, since the same screws which hold the stator in place also hold the end shield in place, the prior art has had difficulty in accurately measuring the air gap between the rotor and stator, after the end shield has been fastened to the motor.

SUMMARY OF THE INVENTION

An objective of the present invention to provide an end shield for a hydraulic pump-motor with improved sound attenuation characteristics.

Another objective of the present invention is to provide an improved method of assembling a pump having a sound attenuating end shield.

A still further objective of the present invention is to provide a pump-motor with reduced production and maintenance costs.

In accordance with these and other objectives of the present invention, a hydraulic pump-motor end shield is provided having multiple embodiments, wherein each embodiment improves the motor attenuation characteristics of known motor end shields, and which facilitates the efficient and accurate assembly of the motor-pump unit. Each of the end shield embodiments disclosed herein provides an end shield that includes an outer ring manufactured of metal or other rigid material and a plug manufactured from material such as cast iron or plastic. The metal outer ring is utilized in order to provide a good clamping surface to securely hold the motor stator in place and to assist in maintaining the torque of the stator screws. The plug is secured into the central opening of the ring to substantially close the motor housing. The combination of the plug and the ring prevent reverberation and deaden the acoustic sound generated by the motor during operation.

In one embodiment the plug is made of metal, preferably cast iron, and is much thicker than the metal ring to provide a central mass that disrupts the generally planar shape of the ring member and therefore diminishes the drum-like effect. This embodiment also includes two resilient gaskets which prevent metal to metal contact between the plug and the ring and hold the plug in place.

In another embodiment, the plug is plastic and is press fit into the central opening of the ring. During press-fitting assembly, a resilient shoulder on the plug or other such means snaps into the central opening of the ring to retain the plastic plug in the central opening.

These and other objectives and features of the present invention will become apparent from the following detailed description when taken in conjunction with the accompanying drawings.

BRIEF DESCRIPTION OF THE DRAWINGS

FIG. 1 is a sectional view of a first embodiment of the present invention.

FIG. 2 is a sectional view of a second embodiment of the present invention.

While the present invention will be described and disclosed in connection with certain preferred embodiments and procedures, it is not intended to limit the invention to those specific embodiments disclosed. Rather it is intended to cover all such alternative embodiments and modifications as found within the sphere and scope of the present invention.

DETAILED DESCRIPTION OF THE PREFERRED EMBODIMENTS

Referring now to the drawings, and in particular to FIG. 1, the first embodiment of the present invention is shown in cross-section. As shown, pump-motor 10 includes motor 12 and pump 14 with motor 12 including stator 16 and rotor 18. Rotor 18 is mounted, as is conventional, within stator 16 with air gap 20 therebetween and includes shaft 22 which extends from rotor 18 into pump 14. Motor 12 is peripherally surrounded by motor housing 26 and is bounded on one end by pump body 24. Pump body 24 includes central hub 25 through which shaft 22 is rotatably mounted. Central hub 25 also includes seal assembly 28 which protects motor 12 from contaminants and fluid being communicated from pump 14.

Pump 14 is of a conventional gear pump design having pump cavity 29 formed by pump cover 30 and pump body 24. Pump 14 is provided with a gear set 32 which compresses in-flowing fluid and discharges fluid at an increased pressure. The gears of gear set 32 are provided motion through shaft 22 as rotor 18 rotates within stator 16.

The end of pump-motor 10 opposite pump 14 is closed by end shield 34 that is secured to pump 10 by stator screws 36. Screws 36 extend through stator 16 and are secured to pump body 24. As best shown in FIG. 1, the first embodiment provides a end shield 34 comprised of an annular ring member 38 and an annular plug member 40. Ring member 38 is preferably manufactured of cast aluminum, while plug member 40 is preferably manufactured of cast iron, but members 38, 40 could be manufactured of any suitable combination of materials that provides for sound deadening qualities. Plug member 40 is secured to the ring member 38 and substantially closes a central opening 41 of the ring member 38.

The ring member 38 includes a generally planar support or disc portion 55 and an axially inward extending sleeve portion 54. To increase the sound attenuation characteristics of end shield 34 of the first embodiment, the plug 40 is thicker and preferably at least twice as thick as the planar disc portion 55 of the ring member 38 to provide a central mass that disrupts the planar shape of the ring member 38 which in turn diminishes the drum-like effect. Ring member 38 is also provided with apertures 42 through which stator screws 36 penetrate, and an outer diameter 44 which is dimensioned to correspond to the outer diameter of motor housing 26.

In the present embodiment, the plug member 40 generally includes a radially outward flange or a larger diameter portion 50 and a shaft-like smaller diameter portion 51. The smaller and larger portions 50, 51 are configured to be closely received by the inward sleeve portion 54 of the ring member 38. The sleeve portion 54 includes a radially inward flange 56 that defines the central opening 41. The flange 56 provides an approximate seat that receives the larger diameter portion 50 of the plug 40 with a small air gap therebetween. The smaller diameter portion 51 is similarly closely received in the central opening 41 with a small air gap therebetween. To secure the plug 40 to the ring member 38, a first resilient annular o-ring gasket 58 is retained in an annular groove 60 in the plug to prevent axial movement of the plug 40. A second resilient annular o-ring gasket 62 is compressed between the larger diameter portion 50 of the plug 40 and the flange portion 56. It is an advantage that the first and second o-ring gaskets 58, 62 provide a small air gap between the ring and the plug to prevent substantially all metal to metal contact between the ring member 38 and the plug 40 to thereby prevent rattling therebetween. The resilient nature of the gaskets also dampens vibrations and sound waves between the ring member 38 and plug 40, thereby further enhancing the embodiment's sound deadening qualities. Another advantage of the gaskets is that they allow for larger tolerances between the die cast ring 38 and plug 40 members, thereby reducing manufacturing costs.

Referring now to FIG. 2, the second embodiment of the present invention is shown in cross-section. It is to be understood that where similar elements are provided throughout the several embodiments, identical reference numerals are used to depict the same elements.

The second embodiment uses a plug 100 manufactured of resilient or plastic material such as nylon or polypropylene that is press fit into the central opening 41 of the ring member 38. The plug 100 includes a shaft-like smaller diameter portion 102 and a radially outward flange or larger diameter portion 104. The smaller diameter portion 102 integrally provides a radially outwardly extending shoulder 106 or other retaining mechanism that engages flange 56 to secure the plug 100 to the ring 38. Between the larger portion 104 and the shoulder 106 is a recess 108 which closely receives the inward flange 56. During assembly of the end shield 34, the resilient nature of the plastic material allows the shoulder 106 to bend inward as the plug is being axially pressed into the central opening 41 and then snap outward as the shoulder 106 clears the flange 56.

In operation, each of the embodiments disclosed herein provide improved sound attenuation characteristics through the use of sound deadening end shields 34 that includes a plastic or cast iron plug 40, 100 for substantially closing the central opening 41 of a aluminum ring member 38. Since the natural frequencies of the combination of materials in the end shield 34 do not correspond to the frequency with which pump-motor 10 vibrates, the vibrational energy imparted by motor 12 and pump 14 is substantially deadened by end shield 34 to thereby reduce the acoustic output of pump-motor 10.

With the first embodiment, the plug 40 of cast iron provides a central mass body to the end shield 34 to disrupt the generally planar shape of the ring member 38 to prevent reverberation. With the embodiment depicted in FIG. 2, the plug 100 is manufactured from plastic, a material which is much lighter than the aluminum material of the ring member 38. The absence of mass near the center of the ring member 38 similarly tends to disrupt potential reverberation and therefore decrease the amount of acoustical noise output.

While this invention has been described with an emphasis upon preferred embodiments, it will be obvious to those of ordinary skill in the art that variations of the preferred embodiments may be used and that it is intended that the invention may be practiced otherwise than is specifically described herein. Moreover, it is to be understood that the various features described in the various embodiments disclosed herein can be used in different combinations than those described herein. Accordingly this invention includes all modifications encompassed within the spirit and scope of the invention.

What is claimed is:

1. An end shield for a hydraulic pump-motor of the type having a motor mechanically linked to a pump and a housing surrounding the pump and motor, the housing having first and second open ends, the pump closing the first open end, the end shield closing the second open end, the end shield comprising:

a rigid annular ring including an opening therein secured to the motor housing at the second open end, the ring being attached via bolts securing the motor to the housing; and a plug secured to the metal annular ring, substantially closing the opening while preventing reverberation of the end shield during operation of the motor.

2. The end shield of claim 1 wherein the ring and the plug comprise metal material, and further comprising two gaskets compressed between the plug and the ring to prevent substantially all metal to metal contact therebetween.

3. The end shield of claim 2 wherein the plug consists of cast iron material and the ring consists of cast aluminum material.

4. The end shield of claim 1 wherein the ring includes an axially extending portion configured to closely receive the plug, the axially extending portion having a radially inward flange defining the opening, the plug including a radially outward flange sized larger than the opening and a smaller portion closely received into the opening.

5. The end shield of claim 4 wherein the smaller portion includes a radially outward extending shoulder of resilient material, the shoulder and the outward flange engaging opposing sides of the inward flange to retain the plug in the central opening.

6. The end shield of claim 1 wherein the plug is manufactured from a sound attenuating material.

7. The end shield of claim 6 wherein the plug consists of a material selected from plastic and cast iron.

8. The end shield of claim 1 wherein the plug has an axial thickness that is at least twice as thick as the axial thickness of the ring.

9. An end shield for a hydraulic pump-motor of the type having a motor mechanically linked to a pump and a housing surrounding the pump and motor, the housing having first and second open ends, the pump closing the first open end, the end shield closing the second open end, the end shield comprising:

a metal annular ring secured to the motor housing at the second open end, the ring having a radially extending portion and an axially extending portion, the axially extending portion having a radially inward flange, the radially inward flange defining an annular central opening; and an annular plug secured to the metal annular ring having a larger diameter portion and a smaller diameter portion, the smaller diameter portion being closely received in the central opening to substantially close the central opening.

10. The end shield of claim 9 wherein the plug comprises plastic material and is press fit into the central opening, the smaller diameter portion having a radially outward extending shoulder, the flange being positively locked between the larger diameter portion and the shoulder.

11. The end shield of claim 9 wherein the smaller diameter portion defines an annular groove, and further comprising a first ring gasket retained in the annular groove disposed between the plug and the flange to retain the plug within the central opening, and a second ring gasket disposed between the flange and the larger diameter portion.

12. The end shield of claim 11 wherein plug and the the ring and the plug are manufactured from metal material, the first and second gaskets preventing substantially all metal to metal contact between the ring and the plug.

13. The end shield of claim 12 wherein the plug is manufactured from cast iron and the ring is manufactured from cast aluminum.

14. The end shield of claim 9 wherein the plug comprises a central mass at least twice as thick as the radial extending portion thereby providing a sound attenuating mechanism.

15. A hydraulic pump motor, comprising:

a housing enclosing a motor mechanically linked to a pump, the housing having a substantially cylindrical shape, the pump closing one open end of the housing; and a sound deadening end shield closing an end of the housing opposite the pump, the end shield comprising a ring and a plug, the ring including a disc portion of substantially planar shape and an sleeve portion extending axially inwards towards the pump and having a central opening, the plug being closely received in the sleeve portion to substantially close the central opening.

16. The hydraulic pump of claim 15 wherein the sleeve portion includes a radially inward flange defining the central opening, the plug including a radially outward flange sized larger than the central opening and a smaller diameter portion closely received in the central opening.

17. The hydraulic pump of claim 16 further comprising first and second annular gaskets, the first gasket retained in an annular groove in the smaller diameter portion and engaging the inward flange, the second gasket compressed between the inward and outward flanges, the gaskets providing an air gap between the plug and the ring to prevent substantially all metal to metal contact therebetween.

18. The hydraulic pump of claim 17 wherein the plug is manufactured from cast iron material and the ring is manufactured from cast aluminum material.

19. The hydraulic pump of claim 16 wherein the smaller portion of the plug includes radially outward shoulder, the shoulder and the outward flange of the plug engaging the opposing sides of the inward flange to retain the plug in the central opening.

20. The hydraulic pump of claim 19 wherein the plug is manufactured from plastic material and the ring is manufactured from cast aluminum material.

* * * * *